ABF
UNITED STATES PATENT OFFICE.

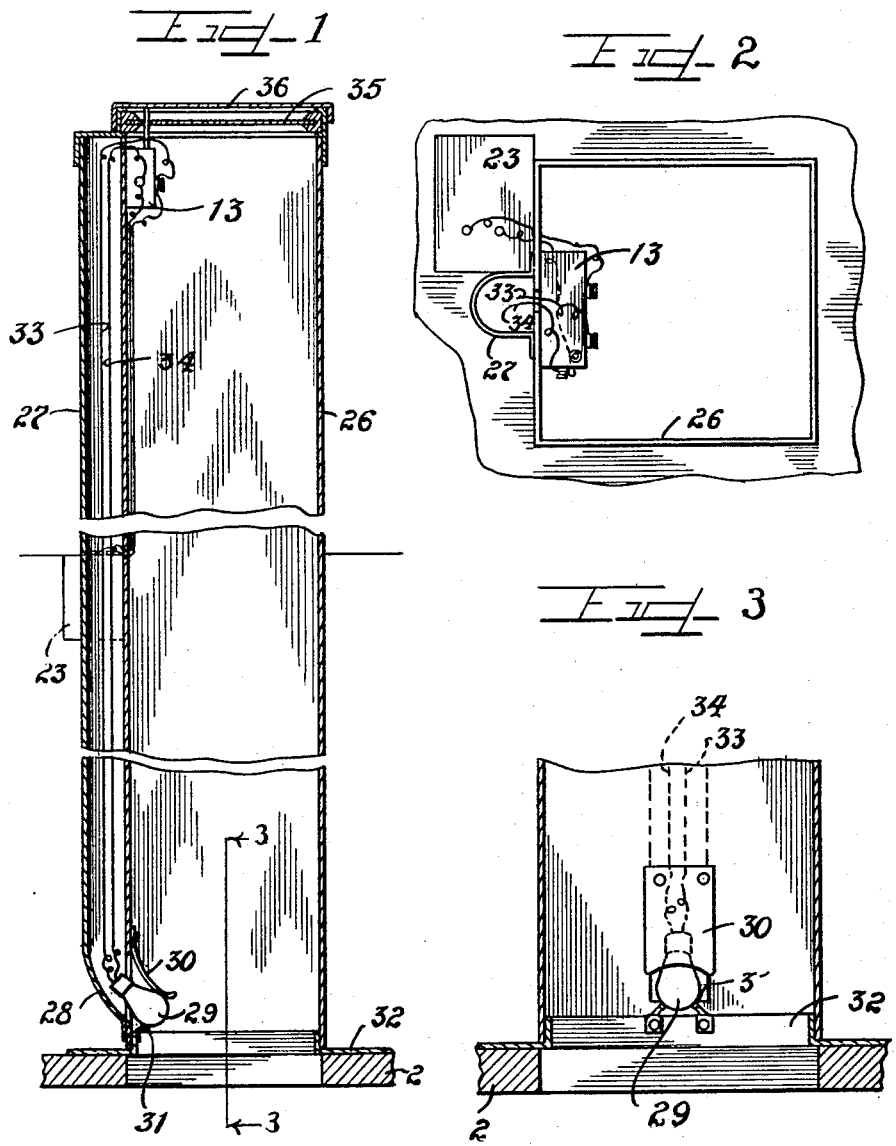

WALLACE H. PETTENGILL, OF CHICAGO, ILLINOIS.

INSPECTION DEVICE.

1,161,882.  Specification of Letters Patent.  Patented Nov. 30, 1915.

Application filed July 23, 1914. Serial No. 852,726.

*To all whom it may concern:*

Be it known that I, WALLACE H. PETTENGILL, a citizen of the United States, and a resident of the city of Chicago, in the county of Cook and State of Illinois, have invented certain new and useful Improvements in Inspection Devices; and I do hereby declare that the following is a full, clear, and exact description of the same, reference being had to the accompanying drawings, and to the numerals of reference marked thereon, which form a part of this specification.

This invention has for its object the construction of an inspection device provided with a removable illuminating means, preferably such as an electric bulb, which is automatically connected to a source of electric energy to cause illumination of the bulb when the cover of the device is open, permitting an observer to look therethrough.

This invention is well adapted for use in scientific investigations, as any object, either under water or beneath the surface of the ground, or in an otherwise inaccessible place, readily may be observed from a convenient position.

This device is adapted for connection more particularly to a casket or coffin, so that when the casket has been buried, an observer standing over the grave may, by throwing back the cover of the inspection device, view the remains.

More particularly this invention consists of an inspection device provided with a view tunnel and a separate light tunnel, permitting illuminating means to be lowered through said light tunnel to the bottom thereof and there communicating in said view tunnel to illuminate the lower end thereof, so that an observer at the upper end of the view tunnel readily may view objects beneath or at the lower end thereof.

A further object of my invention is to provide means for positioning the light automatically when it reaches the bottom of the tunnel, so that it may be in proper position to illuminate the object below.

In the drawings: Figure 1 is a vertical sectional view of my improved device. Fig. 2 is a top plan view thereof with the cover removed. Fig. 3 is a fragmentary detail section taken on line III—III of Fig. 1.

As shown in the drawing: My improved device comprises a rectangular view tunnel 26, provided on the exterior thereof with a long tubular casing 27, which, at its lower end, is rounded or curved inwardly, as indicated by the reference numeral 28, and opens through an aperture into the view tunnel casing 26. Said casing 27 is of a size sufficient to permit the insertion and removal therethrough of an incandescent bulb 29, and, in order to limit the movement thereof into proper position at the bottom of said casings, resilient plates 30 and 31 are provided, extending partly across the opening between said casings. Thus the bulb is held in position to throw the light downwardly, and the upper resilient plate 30 acts to shield the eyes of an observer from the rays thereof. An angle iron 32, bent to the shape of the view tunnel, is secured thereto and to the casing 2, rigidly to connect the two, and a switch or contact mechanism is mounted in a casing 13, provided at the upper end of the view tunnel 26. Lead wires 33 and 34 are connected to the bulb 29 and to the switch mechanism, and receive the current, when the contact is made, from the battery within the casing 23, secured on one side of the view tunnel. A pane of glass 35 is secured in the upper end of said view tunnel 26, and a hinged cover 36 is adapted when closed to cover each of said casings 26 and 27, and when open of course swings entirely away from both thereof. This arrangement also permits the bulb to be taken away, so that in the event of unauthorized use of the device, one not in possession of a bulb cannot see within the casket.

I claim as my invention:

An inspection device comprising a tunnel, a tubular casing fixed to the exterior of said tunnel and curved at its lower end toward said tunnel, the latter being apertured opposite said curved portion, resilient upper and lower plates disposed in said tunnel above and below said aperture, and a light adapted to be inserted into and removed from said tubular casing from the top thereof, said light when disposed in the bottom of said casing projecting into said tunnel and being positioned therein by said resilient plates.

In testimony whereof I have hereunto subscribed my name in the presence of two subscribing witnesses.

WALLACE H. PETTENGILL.

Witnesses:
CHARLES W. HILLS, Jr.,
FRANK K. HUDSON.

Copies of this patent may be obtained for five cents each, by addressing the "Commissioner of Patents, Washington, D. C."